(12) United States Patent
Heyne et al.

(10) Patent No.: US 11,305,661 B2
(45) Date of Patent: Apr. 19, 2022

(54) MODULAR CHARGING STATION FOR ELECTRIC AUTOMOBILES

(71) Applicants: Dr. Ing. h.c. F. Porsche Aktiengesellschaft, Stuttgart (DE); ads-tec GmbH, Nuertingen (DE)

(72) Inventors: Raoul Heyne, Wiernsheim (DE); Florian Joslowski, Leinfelden-Echterdingen (DE); Michael Kiefer, Stuttgart (DE); Thomas Speidel, Markgröningen (DE); Ali Natour, Hochdorf (DE); Matthias Bohner, Stuttgart (DE)

(73) Assignees: Dr. Ing. h.c. F. Porsche Aktiengesellschaft; ads-tec Energy GmbH

( * ) Notice: Subject to any disclaimer, the term of this patent is extended or adjusted under 35 U.S.C. 154(b) by 184 days.

(21) Appl. No.: 16/526,187

(22) Filed: Jul. 30, 2019

(65) Prior Publication Data
US 2020/0039378 A1   Feb. 6, 2020

(30) Foreign Application Priority Data
Jul. 31, 2018 (DE) .................. 10 2018 212 740.9

(51) Int. Cl.
| | | |
|---|---|---|
| B60L 53/00 | (2019.01) | |
| B60L 53/31 | (2019.01) | |
| B60L 53/67 | (2019.01) | |
| B60L 53/14 | (2019.01) | |
| B60L 53/53 | (2019.01) | |
| H02J 7/00 | (2006.01) | |

(52) U.S. Cl.
CPC .............. *B60L 53/31* (2019.02); *B60L 53/14* (2019.02); *B60L 53/53* (2019.02); *B60L 53/67* (2019.02); *H02J 7/0045* (2013.01)

(58) Field of Classification Search
CPC .......... B60L 53/31; B60L 53/67; B60L 53/14; H02J 7/02; H02J 7/13; H02J 1/102; Y02T 90/12; Y02T 90/14; Y02T 10/7072
See application file for complete search history.

(56) References Cited

U.S. PATENT DOCUMENTS

| | | | |
|---|---|---|---|
| 4,591,777 A * | 5/1986 | McCarty | H02J 7/0013 15/DIG. 1 |
| 7,256,516 B2 | 8/2007 | Buchanan et al. | |
| 9,561,731 B2 * | 2/2017 | Johnson | B60L 53/31 |
| 9,698,598 B2 * | 7/2017 | Ballatine | B60L 53/67 |
| 9,748,795 B2 * | 8/2017 | Jung | B60L 50/62 |
| 9,902,276 B2 * | 2/2018 | Bianco | B60L 53/14 |
| 9,908,421 B2 * | 3/2018 | Koolen | B60L 53/11 |
| 9,963,891 B2 * | 5/2018 | Maurus | B60L 53/51 |
| 10,391,870 B2 * | 8/2019 | Gotz | B60L 3/00 |
| 10,759,293 B2 * | 9/2020 | Heyne | B60L 53/30 |

(Continued)

FOREIGN PATENT DOCUMENTS

| | | |
|---|---|---|
| DE | 102015110023 A1 | 12/2016 |
| DE | 102016123923 A1 | 6/2018 |

(Continued)

*Primary Examiner* — Naum Levin
(74) *Attorney, Agent, or Firm* — RatnerPrestia

(57) ABSTRACT

A charging station for electric automobiles having a variable number of power electronics modules and a variable number of charging connections electrically connected to the power electronics modules.

10 Claims, 9 Drawing Sheets

(56) References Cited

U.S. PATENT DOCUMENTS

| | | | |
|---|---|---|---|
| 10,797,496 B2* | 10/2020 | Grifoni | H02J 7/0027 |
| 10,994,628 B2* | 5/2021 | Heyne | B60L 53/14 |
| 2004/0189251 A1* | 9/2004 | Kutkut | H02M 3/3376 |
| | | | 320/128 |
| 2008/0067974 A1 | 3/2008 | Zhang et al. | |
| 2010/0106631 A1* | 4/2010 | Kurayama | B60L 53/305 |
| | | | 705/34 |
| 2011/0285345 A1* | 11/2011 | Kawai | H02J 7/045 |
| | | | 320/107 |
| 2012/0200256 A1* | 8/2012 | Tse | B60L 11/1816 |
| | | | 320/109 |
| 2014/0062401 A1* | 3/2014 | Gadh | B60L 53/66 |
| | | | 320/109 |
| 2015/0048778 A1* | 2/2015 | Davidson | H02J 7/0027 |
| | | | 320/101 |
| 2015/0123613 A1* | 5/2015 | Koolen | B60L 53/11 |
| | | | 320/109 |
| 2015/0328999 A1* | 11/2015 | Dureau | H02J 7/0026 |
| | | | 320/109 |
| 2016/0114692 A1* | 4/2016 | Tripathi | H02J 7/0021 |
| | | | 320/109 |
| 2016/0375781 A1 | 12/2016 | Herke et al. | |
| 2017/0106764 A1* | 4/2017 | Beaston | H02J 7/0027 |
| 2017/0274792 A1* | 9/2017 | Vaughan | B60L 53/14 |
| 2018/0162228 A1 | 6/2018 | Götz et al. | |
| 2018/0212438 A1 | 7/2018 | Bouman | |
| 2019/0372465 A1* | 12/2019 | Xu | H02M 3/337 |
| 2020/0001730 A1* | 1/2020 | Gohla-Neudecker | |
| | | | B60L 53/11 |
| 2020/0171967 A1* | 6/2020 | Gohla-Neudecker | |
| | | | B60L 53/302 |
| 2021/0129701 A1* | 5/2021 | Brombach | H02J 1/102 |

FOREIGN PATENT DOCUMENTS

| | | | | |
|---|---|---|---|---|
| EP | 2572431 | A2 | 3/2013 | |
| JP | 2006020438 | A | 1/2006 | |
| JP | 2012228041 | A | 11/2012 | |
| WO | 2011145939 | A2 | 11/2011 | |
| WO | 2013159821 | A1 | 10/2013 | |
| WO | WO-2013159821 | A1 * | 10/2013 | B60L 53/22 |

* cited by examiner

MODULAR CHARGING STATION FOR ELECTRIC AUTOMOBILES

This application claims priority to German Patent Application No. 10 2018 212 740.9, filed Jul. 31, 2018, the content of such application being incorporated by reference herein in its entirety.

FIELD OF THE INVENTION

The present invention relates to a charging station for electric automobiles.

BACKGROUND OF THE INVENTION

In electrical engineering, any stationary device or electrical system that serves for supplying energy to mobile, battery-operated units, machines or motor vehicles by way of simple setting or insertion without it being necessary for the energy storage element—for example the traction battery of an electric automobile—to be removed compulsorily is referred to as a charging station. Charging stations for electric automobiles are also sometimes referred to as "electricity charging stations" and can comprise a plurality of charging points.

Known here in particular are direct-current fast charging/high-performance charging (HPC) systems such as the so-called combined charging system (CCS), which is widespread in Europe. In the case of direct-current charging of the generic type, direct current is fed from the charging column directly into the vehicle and, for this purpose, is provided by way of a powerful rectifier from the electricity network or by way of large buffer accumulators at solar charging stations, for example. Situated in the vehicle is a battery management system, which communicates with the charging column directly or indirectly in order to adapt the current intensity, or to terminate the process when a capacity limit is reached.

The power electronics system is usually located in this case in the charging column. Since the direct-current connections of the charging column are connected directly to corresponding connections of the traction battery, it is possible for high charging currents to be transmitted with little loss, which allows short charging times.

The various charging stations that are used worldwide are usually designed in one power class and can then no longer be expanded. Modular systems that can be retrofitted later have until now hardly been used or known.

EP2572431B1, which is incorporated by reference herein, describes a charging system having a plurality of charging connections, of which each can provide power to at least one electric vehicle. To this end, there are a plurality of power converters in order to convert the power of the power source to a suitable format for charging the vehicle. Furthermore, a switchable connection matrix is provided in order to connect at least one of the power converters to at least one charging connection. The charging system contains a control unit in order to control at least one power converter and/or the switching processes of the connection matrix. Finally, there are communication means in order to exchange parameters with the electric vehicle.

U.S. Pat. No. 7,256,516B2, which is incorporated by reference herein, discloses a charging station for charging a multiplicity of batteries. To this end, an input-side grid connection is divided over a multiplicity of secondary connections, wherein the secondary connections overall exceed the power of the input-side grid connection. Furthermore, one or more converters distribute the power of the grid connection over a multiplicity of secondary connections. In this case, the converters can output more power at the secondary connection than they receive from the grid connection.

DE102015110023A1, which is incorporated by reference herein, discloses a charging station that can be expanded in a flexible manner up to a maximum power and which is embodied as a high-power rectifier having a plurality of rectifier modules (in each case having DC-isolated outgoing lines), step-down DC/DC converters and a buffer storage element capable of feedback.

WO2013159821A1, which is incorporated by reference herein, describes a modular charging device having a variable number of charging connections and converter units of identical construction (which are also able to be retrofitted as an insert), which each have an AC connection, rectifier, DC voltage intermediate circuit, DC/DC converter and DC connection. The converter units can in this case operate selectively in rectifier or inverter operation. Furthermore, a battery can be provided. Each converter unit and, in particular, the rectifier thereof can be switched on and off and operate depending on the power requirement independently of the other; however, power can also be fed in from one DC voltage intermediate circuit into another.

SUMMARY OF THE INVENTION

Described herein is a charging station having a buffer storage element included, which is charged with low grid powers and outputs large powers to electric vehicles for the purpose of charging. The power electronics system of said charging station should be able to supply energy to up to two charging columns by way of one or more charging plugs. In this case, the maximum energy should be available at a respective charging column. If the two charging columns are intended to be supplied with power simultaneously, the energy has to be divided accordingly. The charging column, battery and power electronics system are also intended to be able to be retrofitted, such that a very modular product is produced from the so combinations.

BRIEF DESCRIPTION OF THE DRAWINGS

One exemplary embodiment of the invention is illustrated in the drawings and will be described in more detail below.

DETAILED DESCRIPTION OF THE INVENTION

Figure 1:
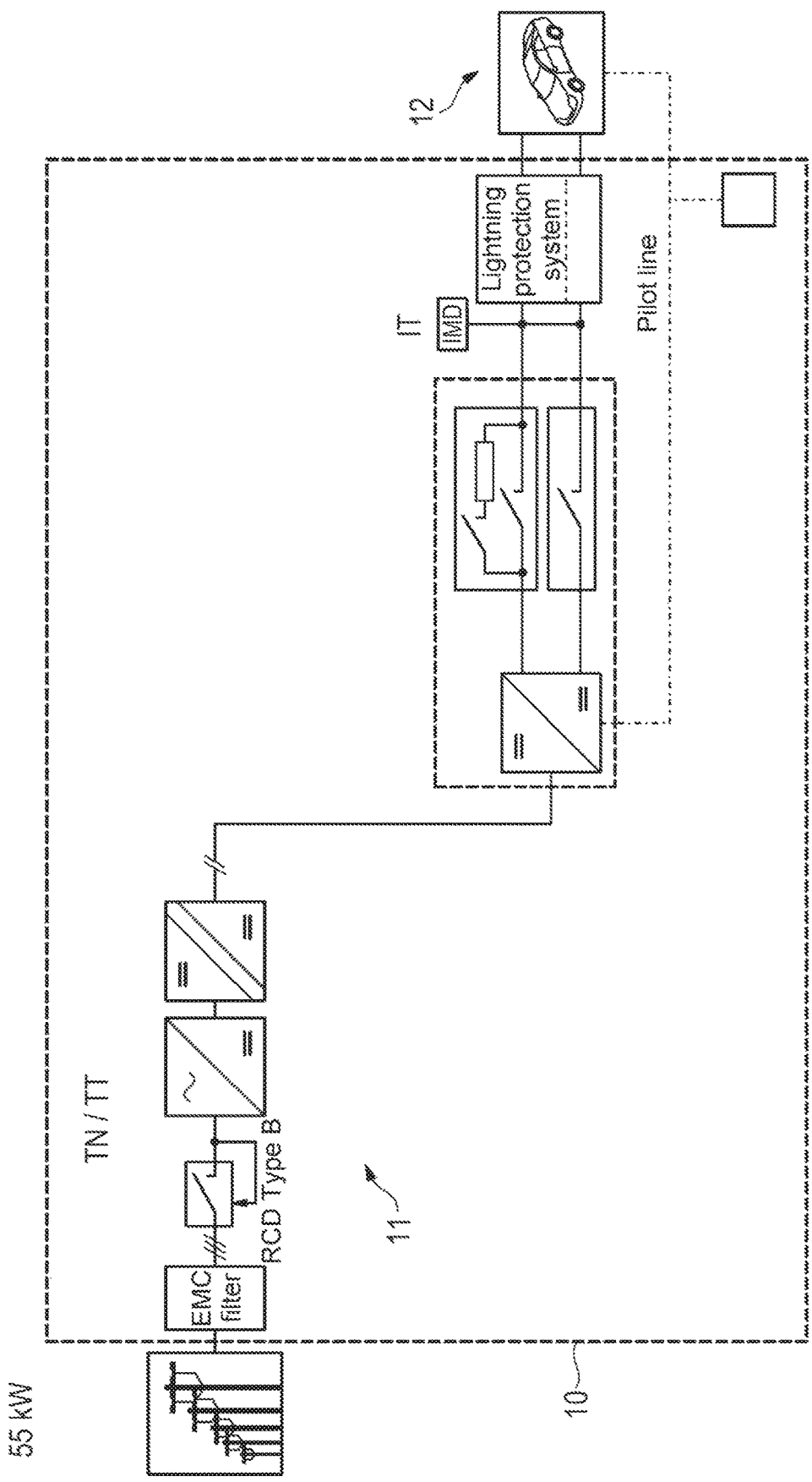
FIG. 1 shows the smallest version of the charging station according to aspects of the invention.
Figure 2:
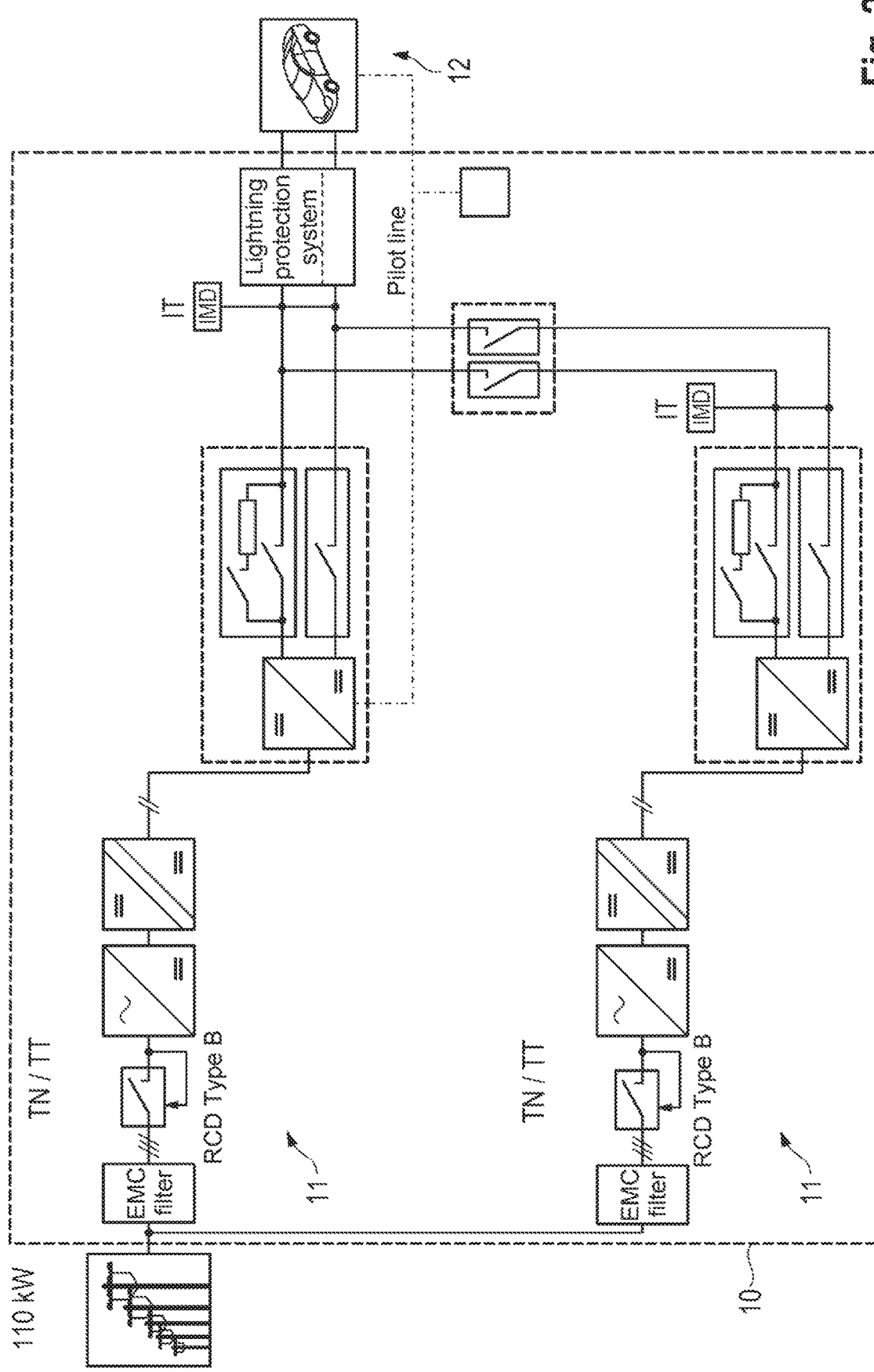
FIG. 2 shows the second smallest version of the charging station according to aspects of the invention.
Figure 3:
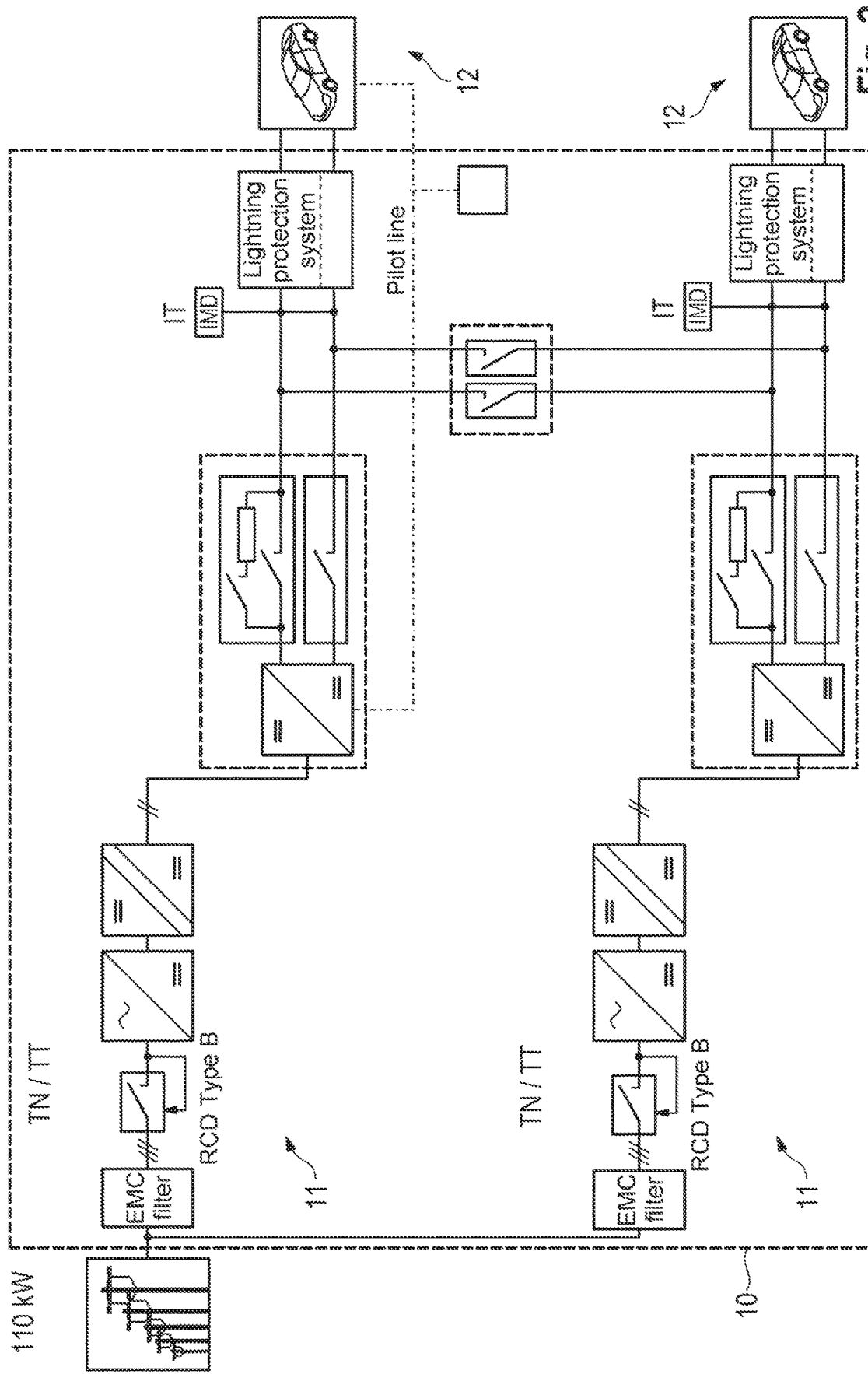
FIG. 3 shows a further small version of the charging station according to aspects of the invention.

The figures, when considered together, illustrate the flexibility of the proposed charging station (10—FIG. 1), the power electronics system of which can be expanded to include a second power electronics module (11) within the same housing (FIG. 2). This is also still possible in retrospect and permits the connection of up to two charging columns (FIG. 3) by means of appropriate charging connections (12).

Figure 5:
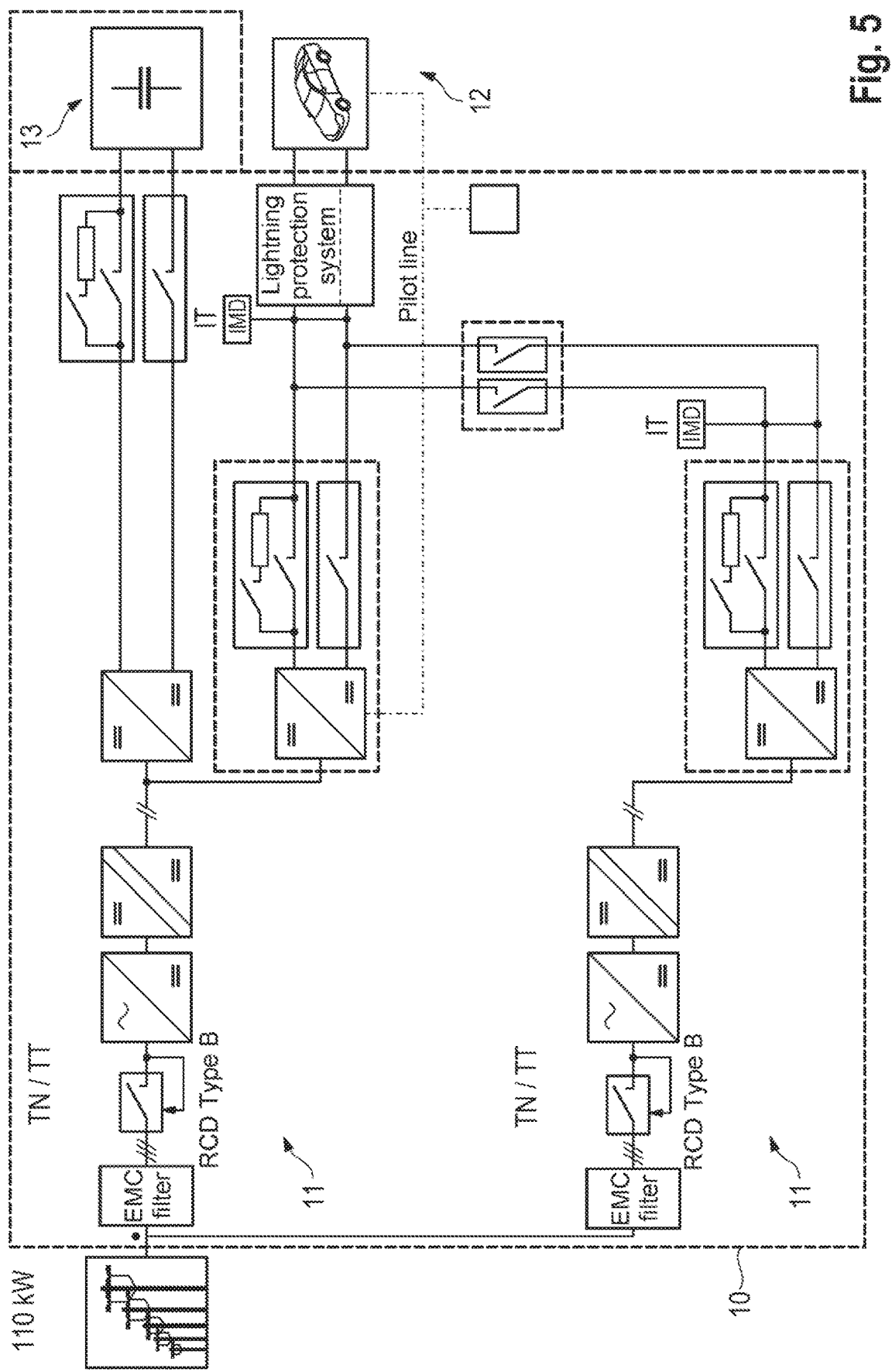
FIG. 5 shows a medium-large version of the charging station according to aspects of the invention.
Figure 6:
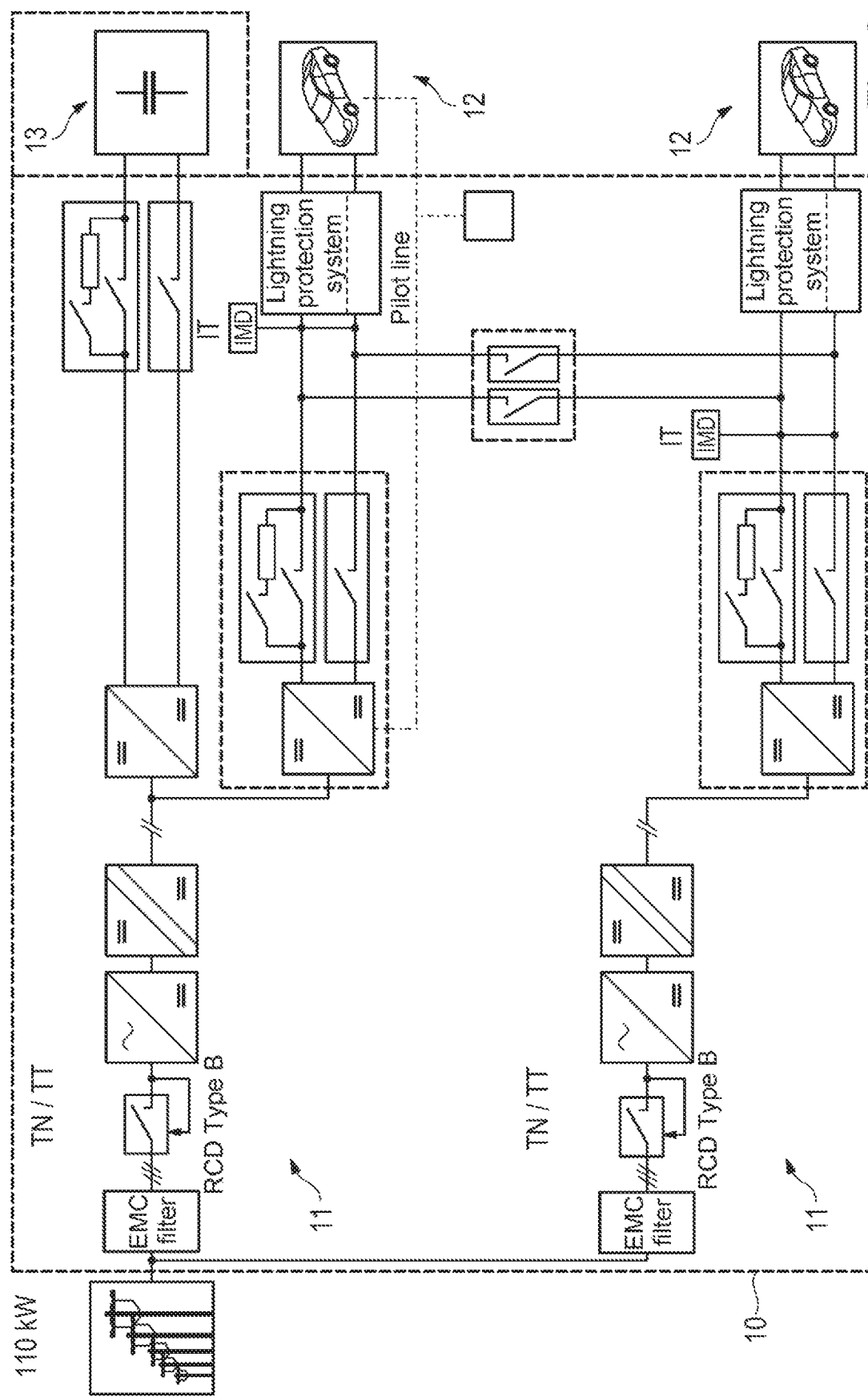
FIG. 6 shows a large version of the charging station according to aspects of the invention.

The charging station (10) can be fitted with a battery (13—FIG. 4) in order to buffer-storage element the energy drawn from the power grid. In this case, in connection with two power electronics modules (11—FIGS. 5 and 6), double the power can also be drawn from the grid and used in order to protect the battery of the charging station (10).

Figure 7:
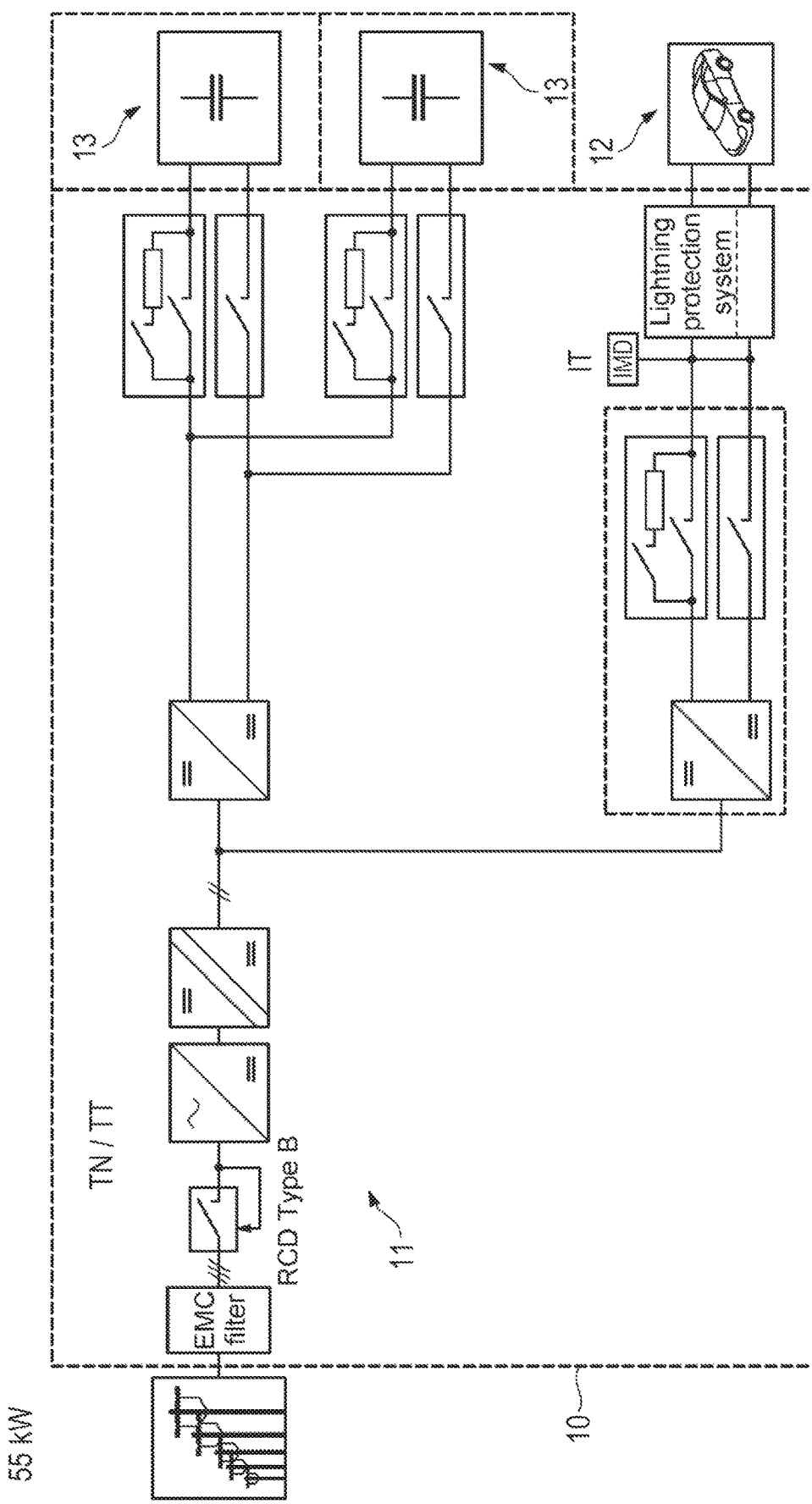
FIG. 7 shows an even larger version of the charging station according to aspects of the invention.
Figure 8:
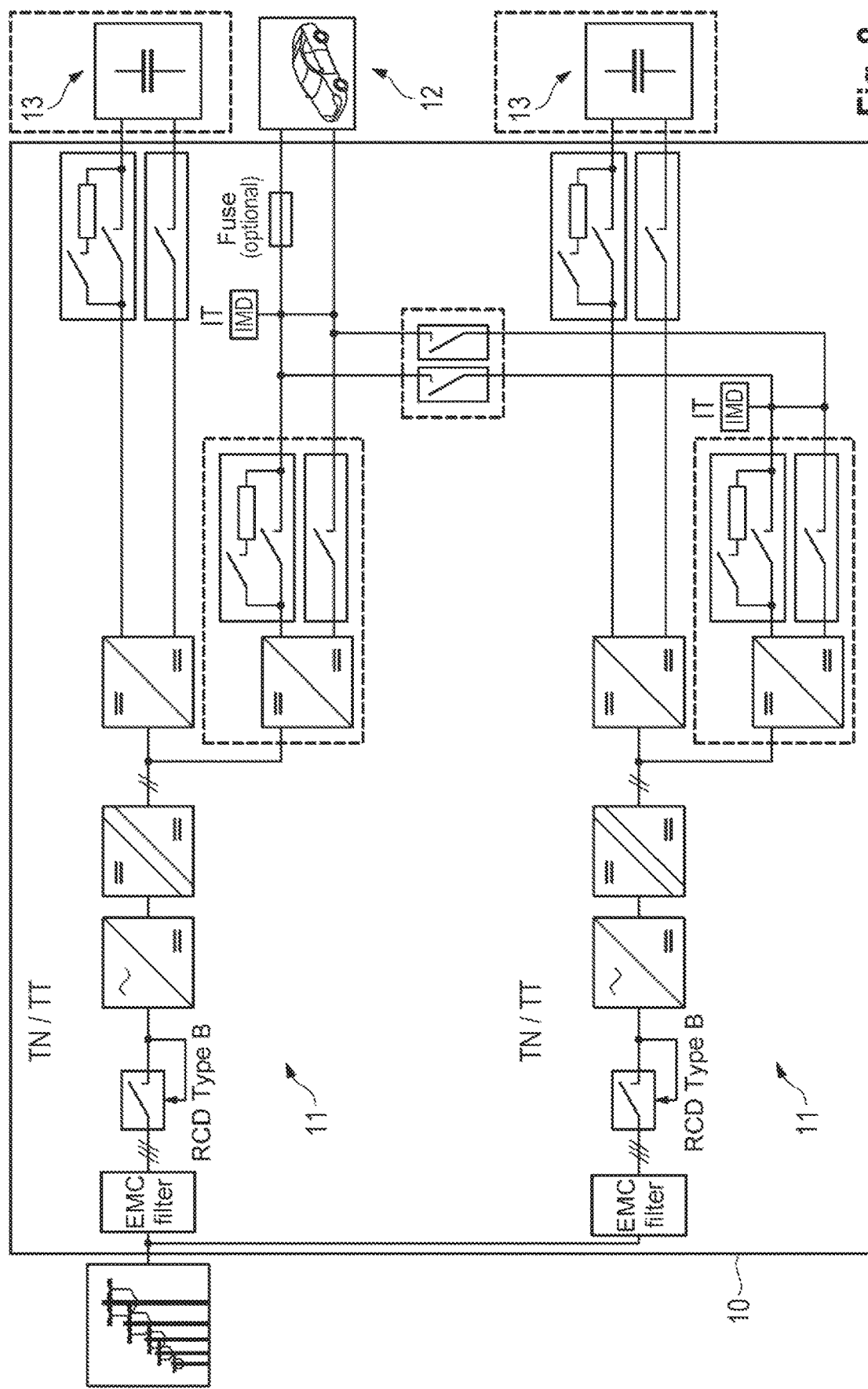
FIG. 8 shows the second largest version of the charging station according to aspects of the invention.

The battery is divided into two battery strings (13) of equal size. Proceeding from a single battery string (13), the capacity thereof can therefore likewise be doubled again within the same housing (FIGS. 7 and 8) in retrospect as well.

Figure 4:
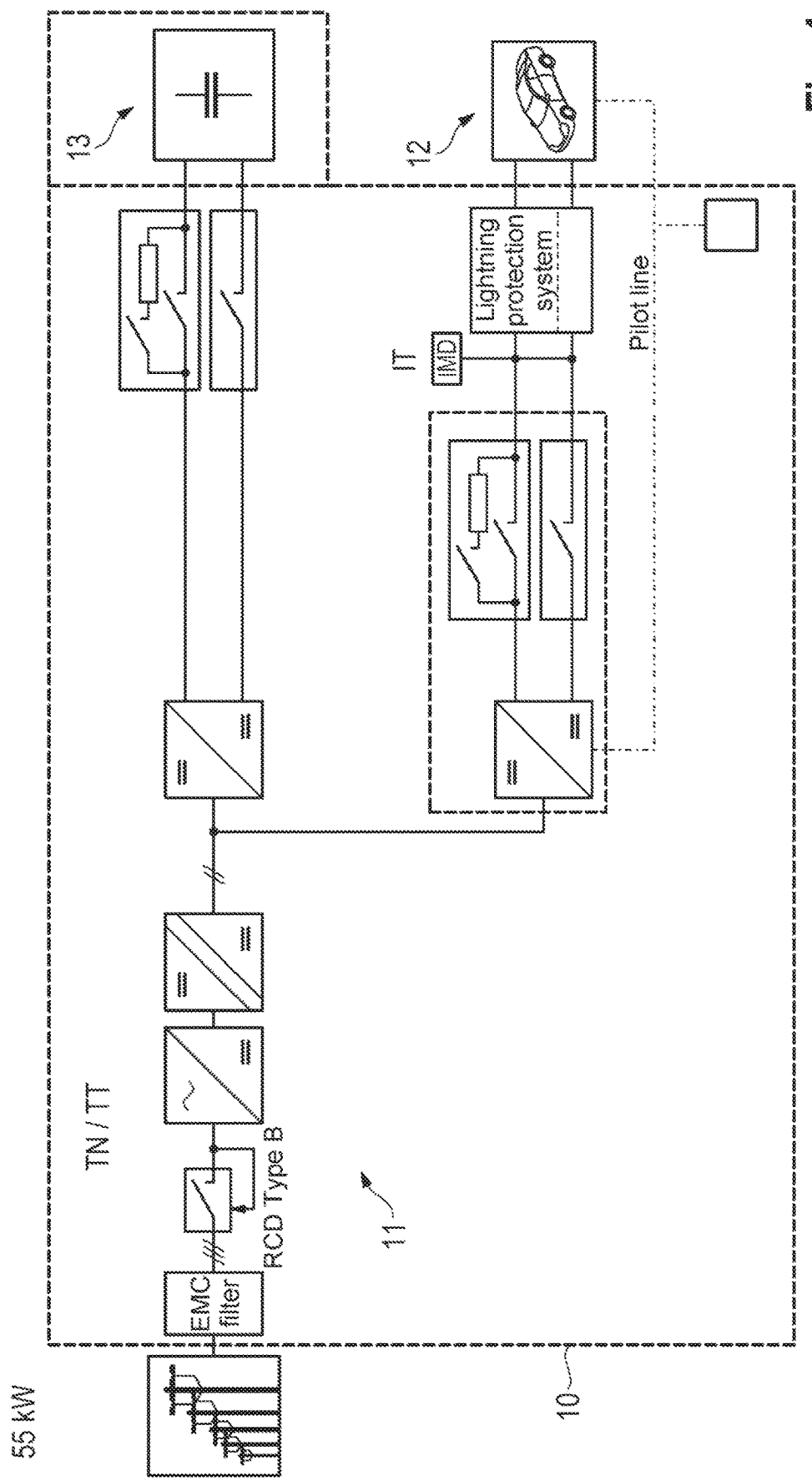
FIG. 4 shows a medium-small version of the charging station according to aspects of the invention.
Figure 9:
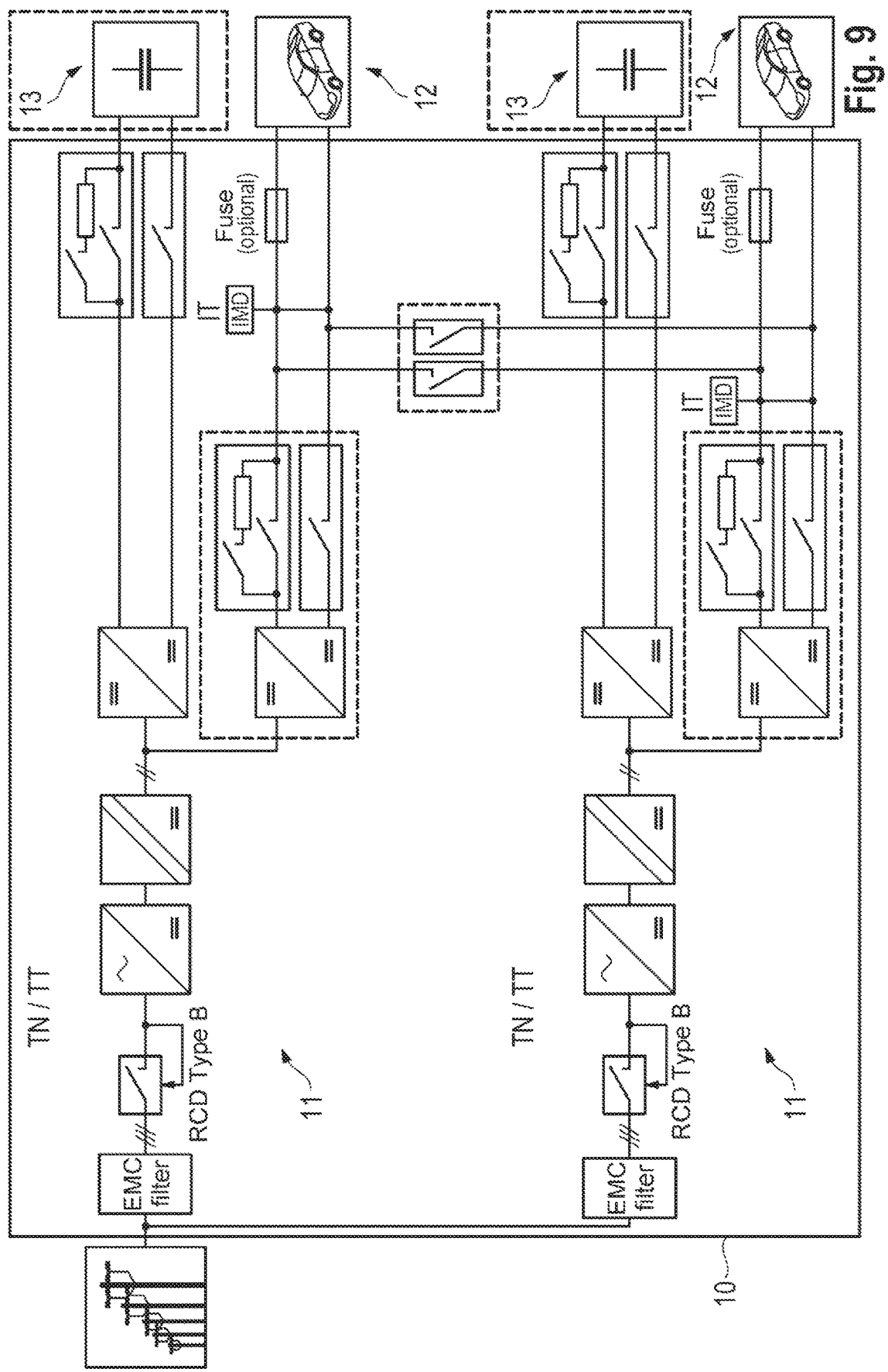
FIG. 9 shows the largest version of the charging station according to aspects of the invention.

Overall, a highly modular system is thus produced, which, for example, can be fitted—according to the configuration as per FIG. 4—first in a very expedient form with a charging column, a power electronics module (11) and a battery string (13). Said system can then be upgraded to up to two charging connections (12) with two power electronics modules (11) and a battery of double size with two battery strings (13), as can be seen in FIG. 9.

What is claimed is:

1. A charging station for electric automobiles comprising:
    a power connection to a power grid;
    a variable number of at least two power electronics modules for converting alternating current (AC) grid power received from the power grid through the power connection to operational direct current (DC) power for a variable number of at least two charging columns that are external to the charging station;
    a variable number of at least two charging connection plugs that separately and respectively electrically connect the variable number of the at least two power electronics modules to the variable number of the at least two charging columns that are external to the charging station and convert the operational power to charging power for charging the electric automobiles; and
    a first set of power switches electrically connected between the at least two power electronics modules; and
    a second set of power switches electrically connected between at least one of the at least two power electronics modules and an external charging battery separate from the electric automobiles,
    wherein:
        in a first state, the first set of power switches and the second set of power switches are configured to connect the at least two power electronics modules and the external charging battery together such that power is shared between the at least two charging columns and the external charging battery, and in a second state, the first set of power switches and the second set of power switches are configured to connect the at least two power electronics modules together and electrically isolate the and the external charging battery from the at least two power electronics modules such that power is shared between the at least two charging columns separate from the external charging battery,
    wherein the charging station is an intermediary retrofitted device that interfaces the variable number of the at least two charging columns that are external to the charging station to the power grid through the separate connection plugs.

2. The charging station as claimed in claim 1, comprising:
    exactly one power electronics module, and
    exactly one charging connection.

3. The charging station as claimed in claim 1, comprising:
    exactly two power electronics modules, and
    exactly one charging connection.

4. The charging station as claimed in claim 1, comprising:
    exactly two power electronics modules, and
    exactly two charging connections.

5. The charging station as claimed in claim 1, comprising:
    exactly one power electronics module,
    exactly one charging connection, and
    one battery string electrically connected to the power electronics module and to the charging connection.

6. The charging station as claimed in claim 1, comprising:
    exactly two power electronics modules,
    exactly one charging connection, and
    one battery string electrically connected to the power electronics modules and to the charging connection.

7. The charging station as claimed in claim 1, comprising:
    exactly two power electronics modules,
    exactly two charging connections, and
    one battery string electrically connected to the power electronics modules and to the charging connections.

8. The charging station as claimed in claim 1, comprising:
    exactly one power electronics module,
    exactly one charging connection, and
    two battery strings electrically connected to the power electronics module and to the charging connection.

9. The charging station as claimed in claim 1, comprising:
    exactly two power electronics modules,
    exactly one charging connection, and
    two battery strings electrically connected to the power electronics modules and to the charging connection.

10. The charging station as claimed in claim 1, comprising:
    exactly two power electronics modules,
    exactly two charging connections, and
    two battery strings electrically connected to the power electronics modules and to the charging connections.

* * * * *